(12) United States Patent
Komamura et al.

(10) Patent No.: US 8,884,775 B2
(45) Date of Patent: Nov. 11, 2014

(54) BELT MONITORING DEVICE FOR INJECTION MOLDING MACHINE

(75) Inventors: Isamu Komamura, Nagano-ken (JP); Yuuki Ashida, Nagano-ken (JP)

(73) Assignee: Nissei Plastic Industrial Co., Ltd., Nagano (JP)

( * ) Notice: Subject to any disclaimer, the term of this patent is extended or adjusted under 35 U.S.C. 154(b) by 662 days.

(21) Appl. No.: 13/190,820

(22) Filed: Jul. 26, 2011

(65) Prior Publication Data
US 2012/0027882 A1 Feb. 2, 2012

(30) Foreign Application Priority Data
Jul. 27, 2010 (JP) .................................. 2010-167820

(51) Int. Cl.
*G08B 21/00* (2006.01)
*B29C 45/76* (2006.01)

(52) U.S. Cl.
CPC ....... *B29C 45/76* (2013.01); *B29C 2945/76214* (2013.01)
USPC ...................... 340/686.3; 340/679; 340/686.5; 425/136; 425/138; 425/151; 425/169

(58) Field of Classification Search
USPC ................. 425/136, 151, 153, 169, 138, 595; 340/679, 686.3, 686.5
See application file for complete search history.

(56) References Cited

U.S. PATENT DOCUMENTS

| 5,929,583 A * | 7/1999 | Catanzaro et al. ............ 318/565 |
| 6,164,947 A | 12/2000 | Miyahara |
| 2005/0061090 A1* | 3/2005 | Oberndorfer et al. ........ 73/865.9 |
| 2008/0057146 A1* | 3/2008 | Nishimura et al. ........... 425/138 |

FOREIGN PATENT DOCUMENTS

| JP | 10-286842 A | 10/1998 |
| JP | 2000-006222 A | 1/2000 |
| JP | 2003-074649 A | 3/2003 |

* cited by examiner

*Primary Examiner* — Brent Swarthout
(74) *Attorney, Agent, or Firm* — Birch, Stewart, Kolasch & Birch, LLP (57) ABSTRACT

There are provided with rotary encoders 7a and 7b, each detecting a rotation position of each of rotation driving portions 4a and 4b, deviation calculating means 8 that obtains a deviation Ke between an encoder output value Da outputted from one specific rotary encoder 7a and an encoder output value Db outputted from the other rotary encoder 7b, abnormality determining means 9 that compares the deviation Ke with threshold values Ksf and Kss set in advance and determines that the deviation Ke has become the threshold value Ksf or more and/or the threshold value Kss or more, and abnormality output means 10 that outputs at least a determination result of the abnormality determining means 9.

19 Claims, 5 Drawing Sheets

|  | AT INITIAL ADJUS- TMENT | NORMAL TIME | ABNOR- MALITY DETECTED | AT RE- ADJUST- MENT | TOOTH- SKIP DETECTED |
|---|---|---|---|---|---|
| Da | 5100 | 7870 | 7870 | 7870 | 7870 |
| Db | 5110 | 7880 | 7930 | 7930 | 8030 |
| GENUINE DEVIATION | 10 | 10 | 60 | 60 | 160 |
| ADJUSTED VALUE | 10 | 10 | 10 | 60 | 60 |
| Ke | 0 | 0 | 50 | 0 | 100 |
| PROCESSING |  |  | OUTPUT OF Ax |  | OUTPUT OF Ay |

Fig. 7

BELT MONITORING DEVICE FOR INJECTION MOLDING MACHINE

TECHNICAL FIELD

The present invention relates to a belt monitoring device for an injection molding machine which monitors abnormality in a plurality of timing belts that transmit rotation from a plurality of rotation driving portions to one driven shaft.

BACKGROUND ART

Hitherto, an injection molding machine has been known which is provided with a plurality of timing belts extended between at least one or more driven pulleys provided on one driven shaft and a driving pulley provided on each of rotation shafts of a plurality of rotation driving portions, and Patent Document 1 discloses an injection molding machine which linearly drives a screw in a heating cylinder by a plurality of injection servo motors provided with a single rotary-linear motion conversion mechanism which is connected to a rear end of the screw through a connecting member and converts a rotary motion to a linear motion and transmits the result to the screw, a single driven pulley connected to a rotary member of this rotary-linear motion conversion mechanism so as to be integrally rotated, and a plurality of timing belts which transmit rotation of a driving pulley fastened to an output shaft of each of the plurality of injection servo motors to the driven pulley.

In this type of injection molding machine, since a plurality of servo motors are used, synchronous control for each of the servo motors is required, and also, tension of each of timing belts provided in the plurality of rotary-linear conversion mechanisms needs to be set to the same. If this balance is lost, the timing belt might be fractured, the rotary shaft might be broken or the like, and malfunction, unnecessary interruption of production or the like is forced.

Therefore, a detecting device that can detect fracture of the timing belt so as to prevent occurrence of malfunction and the like is known, and Patent Document 2 discloses a belt fracture detecting device including at least one or more projections provided in the circumferential direction on the side face of the driven pulley, a proximity switch arranged so as to oppose the projections and transmits an ON-OFF signal by the projections with rotation of the driven pulley, and a controller that controls operation/stop of the motor in accordance with presence of the ON-OFF signal from this proximity switch. Patent Document 3 discloses a fail-safe device that uses a belt detection portion which detects presence of a transmission belt as an abnormality detection portion that detects abnormality of the transmission belt and displaces an engaged body by controlling a driving control portion so as to be engaged with an engaging portion.

SUMMARY OF INVENTION

Technical Problem

However, the detecting device (the belt fracture detecting device and the fail-safe device) disclosed in the above-described Patent Documents 2 and 3 have the following problems to be solved.

First, since both of them detect a state after the belt is fractured, a state before the fracture occurs cannot be detected. Therefore, the fracture of the belt cannot be prevented in advance and that is insufficient from the viewpoint of monitoring of the belt state. Since the belt fracture detecting device in Patent Document 2 detects rotation of the driven pulley, if a plurality of motors is used, even in the case of fracture of one of the belts, the driven pulley continues rotation, which makes monitoring difficult.

Secondly, both of them need to install separate detecting means, that is, a plurality of projections and a proximity switch that detects the projections or a belt detection portion that detects presence of a transmission belt. Therefore, the number of processes in manufacture and a cost are increased with an increase in the number of components, a space for installation needs to be ensured, and the structure thereof is complicated.

Solution to Problem

In order to solve the above-described problems, when a belt monitoring device 1 for an injection molding machine M that monitors abnormality in a plurality of timing belts 6a and 6b extended between at least one or more driven pulleys 3 disposed on one driven shaft 2 and driving pulleys 5a and 5b disposed on rotation shafts 4as and 4bs of a plurality of rotation driving portions 4a and 4b, respectively, is to be configured, the present invention is characterized by including a molding machine controller 41 having rotary encoders 7a and 7b that detect a rotation position of each of the rotation driving portions 4a and 4b by being installed in the rotation driving portions 4a and 4b, respectively, deviation calculating means 8 that takes in encoder output values Da and Db outputted from each of the rotary encoders 7a and 7b and obtains a deviation Ke between the encoder output value Da outputted from one specific rotary encoder 7a and the encoder output value Db outputted from the other rotary encoder 7b, abnormality determining means 9 that compares the deviation Ke with threshold values Ksf and Kss set in advance and determines that the deviation Ke is the threshold values not less than Ksf or Kss, and abnormality output means 10 that outputs at least a determination result of the abnormality determining means 9.

Advantageous Effects of Invention

According to the belt monitoring device 1 for an injection molding machine M according to the present invention having the above configuration, the following remarkable advantageous effects can be exerted.

(1) A deviation Ke between the encoder output value Da outputted from the one specific rotary encoder 7a and the encoder output value Db outputted from another rotary encoder 7b is obtained by the deviation detecting means 8, and the deviation Ke is compared with the threshold values Ksf and Kss set in advance in order to make determination, and thus, at least relative abnormality of each of the timing belts 6a and 6b can be detected. Therefore, a state before fracture of each of the timing belts 6a and 6b can be detected, and contribution can be made to prolongation of the life of each of the timing belts 6a and 6b.

(2) Since the encoder output values Da and Db outputted from each of the rotary encoders 7a and 7b are directly used, separate detecting means such as a proximity switch, a belt detection portion and the like is no longer needed. Therefore, since the number of components is not increased, the number of processes and a cost in the manufacture can be reduced, and since an installation space does not have to be ensured any longer, contribution can be also made to simplification of the structure and improvement of appearances.

(3) Since the encoder output values Da and Db are used as they are, a configuration of a control system including software can be simplified, and since the positions of the driving pulleys 5a and 5b can be directly detected, elongation of each of the timing belts 6a and 6b and the like can be detected accurately and reliably.

(4) According to a preferred embodiment, if zero adjusting means 11 which considers the deviation Ke as zero is provided, it can be used as an actual zero resetting function, and thus, an occurrence degree of the deviation Ke can be grasped easily and reliably.

(5) According to the preferred embodiment, if the threshold value includes the first threshold value Ksf which can detect abnormality relating to elongation of the timing belts 6a and 6b, the threshold value corresponding to the abnormality relating to the elongation of the timing belts 6a and 6b can be set, and thus, relative elongation of the timing belts 6a and 6b caused by use can be reliably detected, and also, a normal or abnormal state with respect to the elongation of the timing belts 6a and 6b can be accurately determined.

(6) According to the preferred embodiment, if abnormality output means 10 has a function of outputting a first alarm Ax notifying that abnormality relating to the elongation of the timing belts 6a and 6b has occurred on the basis of the determination result that the first threshold value Ksf is reached, an operator can grasp the occurrence of abnormality relating to the elongation of the timing belts 6a and 6b quickly and reliably and can take a measure such as readjustment of tension in the timing belts 6a and 6b or the like quickly.

(7) According to the preferred embodiment, if the second threshold value Kss that can detect abnormality relating to tooth skip of the timing belts 6a and 6b is included in the threshold value, by setting a threshold value corresponding to one pitch of teeth, occurrence of tooth skip in the timing belts 6a and 6b can be reliably detected.

(8) According to the preferred embodiment, if the abnormality output means 10 has a function of outputting a second alarm Ay notifying that abnormality relating to tooth skip of the timing belts 6a and 6b has occurred on the basis of the determination result that the second threshold value Kss is reached, an operator can grasp the occurrence of abnormality relating to the tooth skip in the timing belts 6a and 6b quickly and reliably and can take a measure such as replacement of a belt or the like quickly.

DESCRIPTION OF THE EMBODIMENTS

Subsequently, a preferred embodiment according to the present invention will be explained in detail on the basis of the attached drawings. The attached drawings do not specify the present invention but are used for facilitation of understanding of the present invention. Also, in order to avoid ambiguity of the invention, detailed explanation will be omitted for known parts.

First, a configuration of an injection molding machine M provided with a belt monitoring device 1 according to this embodiment will be described by referring to FIG. 2 and FIG. 3.

Figure 2:
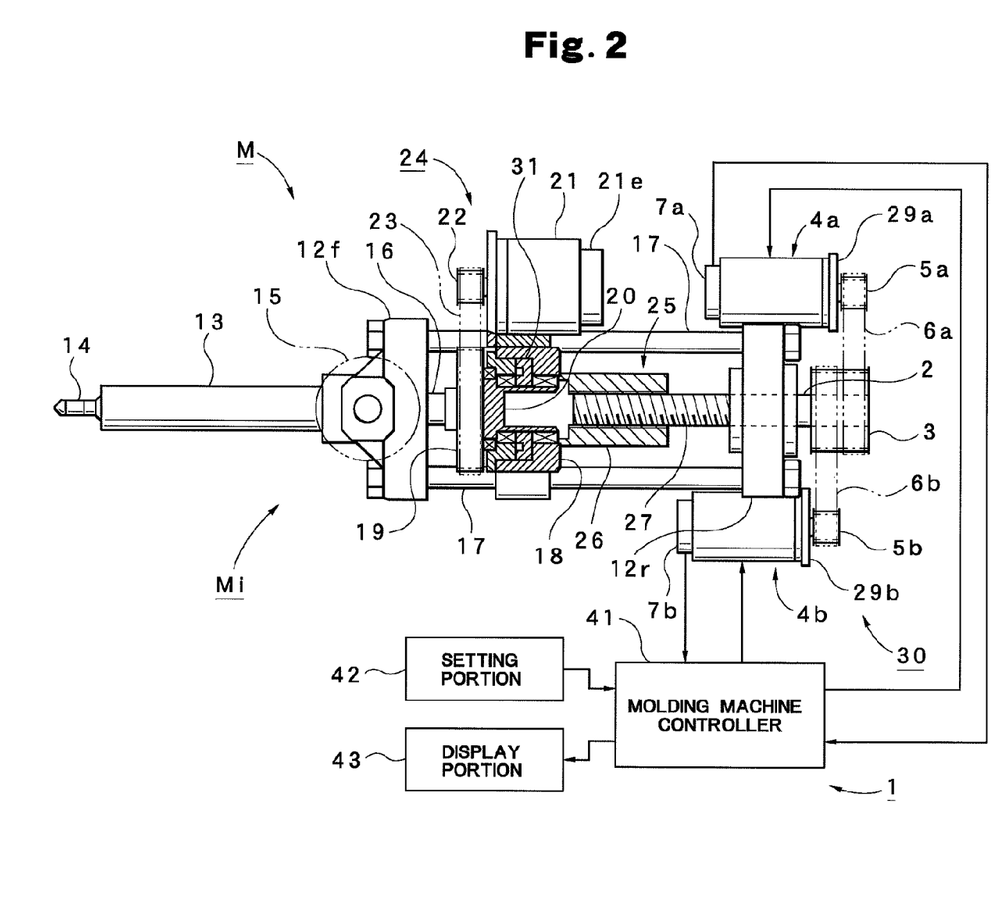
FIG. 2 is a partially sectional plan configuration diagram of an injection device in an injection molding machine provided with the belt monitoring device.

The injection molding machine M illustrated in FIG. 2 shows only an injection device Mi excluding a clamping device. The injection device Mi is provided with a front supporting disk 12f and a rear supporting disk 12r, provided separately from each other, and supports a rear end of a heating cylinder 13 on the front face of the front supporting disk 12f. The heating cylinder 13 is provided with an injection nozzle 14 on the front end and a hopper 15 which supplies a molding material into the heating cylinder 13 in the rear part, respectively, and inserts a screw 16 through the heating cylinder 13. On the other hand, between the front supporting disk 12f and the rear supporting disk 12r, four tie bars 17 . . . are extended, and a slide block 18 is slidably loaded on the tie bars 17 . . . . On the front end of the slide block 18, a rotary block 20 integrally having a driven pulley 19 is rotatably supported, and the rear end of the screw 16 is joined to the center of this rotary block 20. Moreover, on the side face of the slide block 18, a servo motor 21 for screw rotation is mounted, and between a driving pulley 22 fixed to a rotary shaft of the servo motor 21 and the above-described driven pulley 19, an endless timing belt 23 is extended. As a result, a rotation driving mechanism 24 that rotates the screw 16 is configured. Reference numeral 21e denotes a rotary encoder that is attached to the rear end of the servo motor 21 and detects the rotation speed (rotation position) of the servo motor 21.

On the other hand, in the rear part of the slide block 18, a nut portion 26 is provided coaxially and integrally, and the front side of a ball screw portion 27 rotatably supported by the rear supporting disk 12r is screwed into the nut portion 26. As a result, a ball screw mechanism 25 is configured. On the other hand, the rear part of the ball screw portion 27 projecting rearward from the rear supporting disk 12r becomes a driven shaft 2, and one driven pulley 3 is mounted on this driven shaft 2. Therefore, the driven shaft 2 becomes a rotation transmission shaft which advances or retreats the screw 16 of the injection device Mi with respect to the ball screw mechanism 25. The driven pulley 3 is provided singularly and formed long in the axial direction. As a result, two timing belts 6a and 6b, which will be described later, can be extended side by side. Also, on both the right and left sides of the rear supporting disk 12r, servo motors 29a and 29b for advancing/retreating a screw are disposed, respectively. Each of the servo motors 29a and 29b configures rotation driving portions 4a and 4b, respectively, and driving pulleys 5a and 5b are mounted on the rotary shafts (rotation shafts 4as and 4bs) of the servo motors 29a and 29b, respectively.

Figure 3:
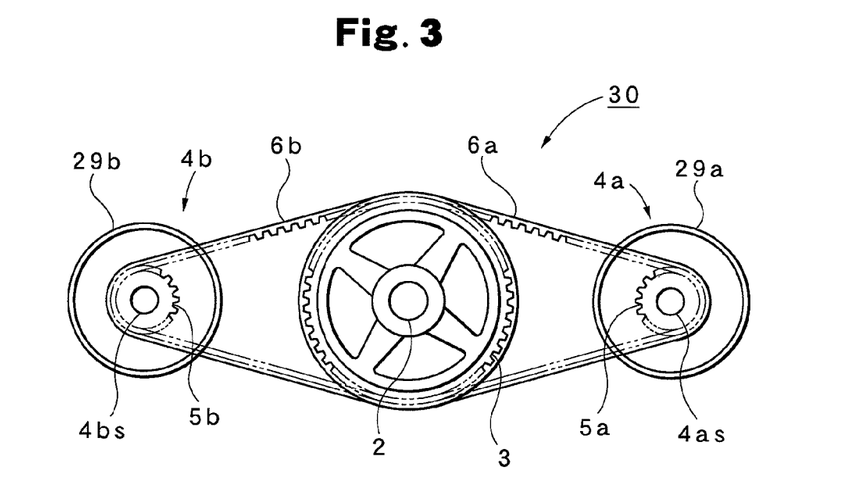
FIG. 3 is a back-face configuration diagram extracting and illustrating a rotation transmission mechanism using a timing belt provided in the injection molding machine.

Then, as illustrated in FIG. 2 and FIG. 3, the endless timing belt 6a is extended between the driving pulley 5a and the driven pulley 3, and the endless timing belt 6b between the driving pulley 5b and the driven pulley 3, respectively. Thus, the positions of the servo motors 29a and 29b are offset from each other in the longitudinal direction (axial direction) so that the timing belts 6a and 6b can be extended side by side at determined positions of the driven pulleys 3. As a result, an advancing/retreating driving mechanism 30 that advances/ retreats the screw 16 is configured. Also, at the rear ends of the servo motors 29a and 29b, rotary encoders 7a and 7b that detect the rotation speed (rotation positions) of the servo motors 29a and 29b are attached, respectively. The exemplified rotary encoders 7a and 7b are absolute-type encoders. In FIG. 2, reference numeral 31 denotes a load cell (pressure detector) that detects a pressure applied on the screw 16 by being intervened between the rotary block 20 and the slide block 18.

On the other hand, in FIG. 2, reference numeral 41 denotes a molding machine controller provided in the injection molding machine M. This molding machine controller 41 is provided with a belt monitoring device 1 according to this embodiment, and a setting portion 42 and a display portion 43 are attached.

Subsequently, a configuration of the belt monitoring device 1 according to this embodiment will be specifically described by referring to FIGS. 1 to 5.

Figure 1:
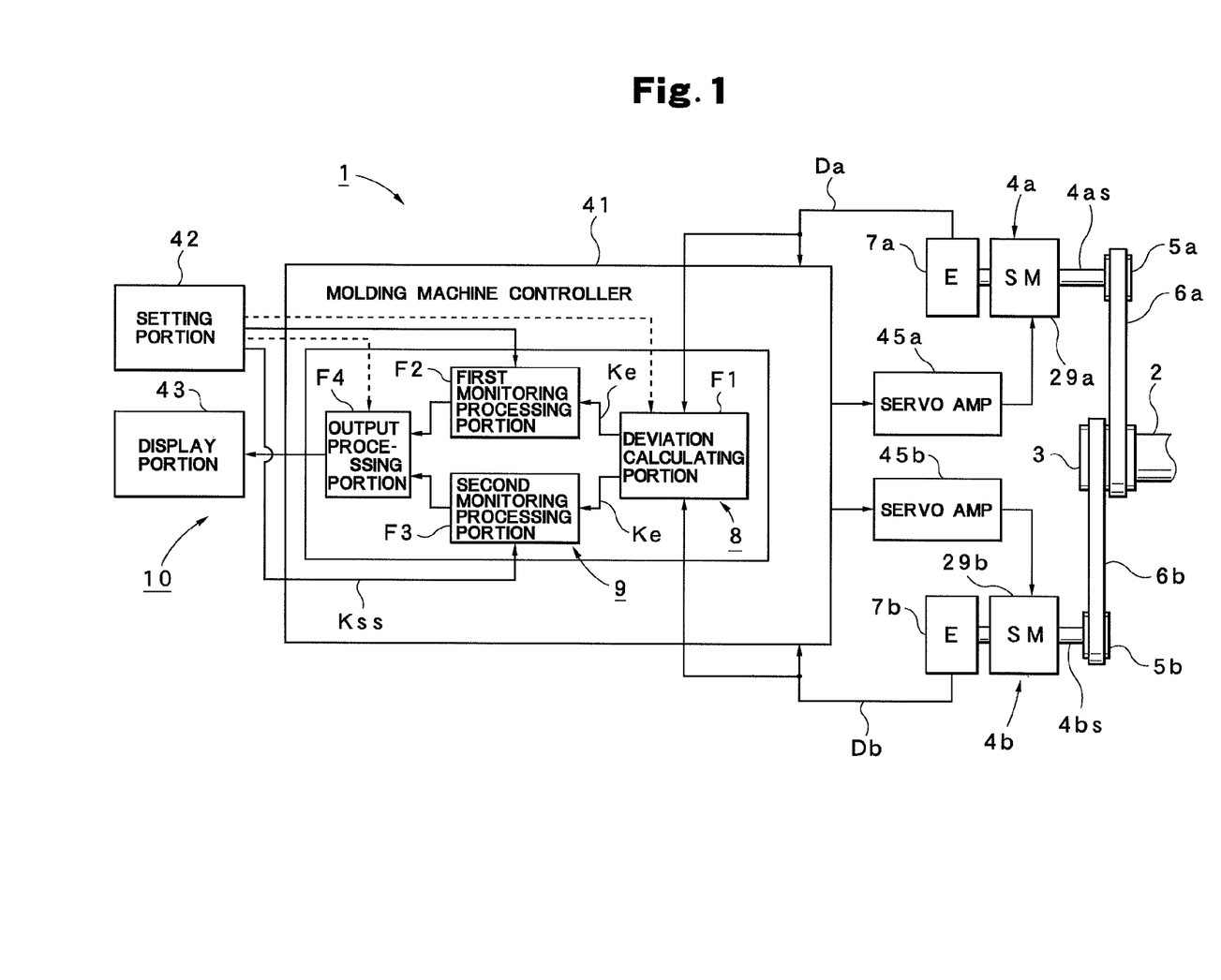
FIG. 1 is a block circuit diagram illustrating a configuration of an essential part in a belt monitoring device according to a preferred embodiment of the present invention.

In FIG. 1, the molding machine controller 41 has a computer function including a CPU, internal memory (ROM, RAM and the like), a power unit and the like and totally controls the injection molding machine M. Also, servo amplifiers 45a and 45b that drive the servo motors 29a and 29b, respectively, are provided, and each of the servo motors 29a and 29b is connected to the output side of each of the servo amplifiers 45a and 45b, and the input sides of each of the servo amplifiers 45a and 45b is connected to an output port of the molding machine controller 41. Moreover, the rotary encoders 7a and 7b attached to the servo motors 29a and 29b, respectively, are connected to the input port of the molding machine controller 41. As a result, a control instruction that controls each of the servo motors 29a and 29b is given to the servo amplifiers 45a and 45b from the molding machine controller 41, and encoder output values Da and Db are given to the molding machine controller 41 from the rotary encoders 7a and 7b.

Also, the molding machine controller 41 also functions as the belt monitoring device 1 according to this embodiment. Thus, in the internal memory of the molding machine controller 41, a control program that executes a series of control (sequence control) in the entire belt monitoring device 1 is stored, and various types of data such as threshold values, detection data and the like are also stored.

In FIG. 1, reference numeral 1 denotes the belt monitoring device using a functional block. The belt monitoring device 1 is provided with a deviation calculating portion F1, a first monitoring processing portion F2, a second monitoring processing portion F3, and an output processing portion F4. In this case, into an input portion of the deviation calculating portion F1, the encoder output value Da outputted from one rotary encoder (specific rotary encoder) 7a and the encoder output value Db outputted from the other rotary encoder (the other rotary encoder) 7b are given. As a result, the deviation calculating portion F1 configures deviation calculating means 8 that obtains a deviation (genuine deviation) Ke between the encoder output value Da and the encoder output value Db by calculation. In this case, an absolute value is used for the deviation Ke.

On one hand, the first monitoring processing portion F2 and the second monitoring processing portion F3 constitute the abnormality determining means 9 which compares the deviation Ke (the deviation after adjustment, which will be described later) with the threshold values Ksf and Kss set in advance and determines that the deviation Ke is the threshold value Ksf and/or Kss or more. In this case, the first threshold value Ksf that can detect abnormality relating to elongation of the timing belts 6a and 6b is set in the first monitoring processing portion F2, while the second threshold value Kss that can detect abnormality relating to tooth skip of the timing belts 6a and 6b is set in the second monitoring processing portion F3. As a result, the first monitoring processing portion F2 can determine that the deviation Ke is the first threshold value Ksf or more and the second monitoring processing portion F3 can determine that the deviation Ke is the second threshold value Kss or more.

Figure 4:
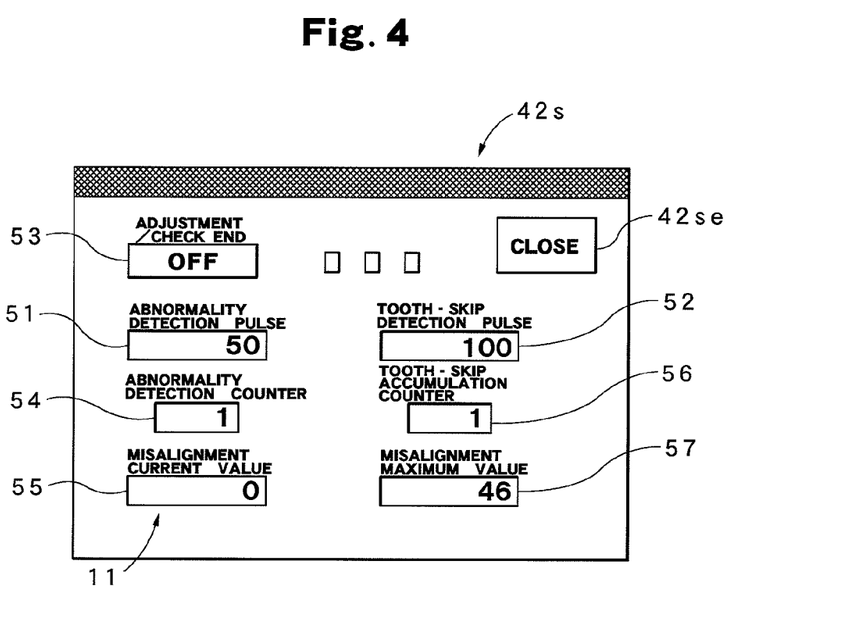
FIG. 4 is a setting screen diagram used in the belt monitoring device.

The first threshold value Ksf and the second threshold value Kss can be set from the setting portion 42 for belt monitoring attached to the molding machine controller 41. FIG. 4 shows a setting screen 42s of the setting portion 42, and the setting screen 42s is provided with an abnormality detection pulse setting key 51 and a tooth-skip detection pulse setting key 52. The first threshold value Ksf can be set by the abnormality detection pulse setting key 51, and the second threshold value Kss can be set by the tooth-skip detection pulse setting key 52. In addition, in the setting screen 42s, reference numeral 53 denotes an adjustment/check end key, reference numeral 54 for an abnormality detection counter, reference numeral 55 for a misalignment current-value display portion, reference numeral 56 for a tooth-skip accumulation counter, reference numeral 57 for a misalignment maximum-value display portion, and reference numeral 42se for a close key, respectively. In this case, the misalignment current-value display portion 55 also functions as zero adjusting means 11 that considers the deviation Ke as zero, which will be described later.

On the other hand, the output processing portion F4 executes output processing of a determination result obtained from the first monitoring processing portion F2 and the second monitoring processing portion F3. The display portion 43 is connected to the output side of this output processing portion F4, and the output processing portion F4 and the display portion 43 constitute the abnormality output means 10. In this case, the abnormality output means 10 is provided with a function of outputting a first alarm Ax (FIG. 5) notifying at least that abnormality relating to elongation of the timing belts 6a and 6b has occurred on the basis of the determination result that the result is the first threshold value Ksf or more in the first monitoring processing portion F2 and is also provided with a function of outputting a second alarm Ay (FIG. 5) notifying at least that abnormality relating to tooth skip of the timing belts 6a and 6b has occurred on the basis of the determination result that the result is the second threshold value Kss or more in the second monitoring processing portion F3.

Figure 5:
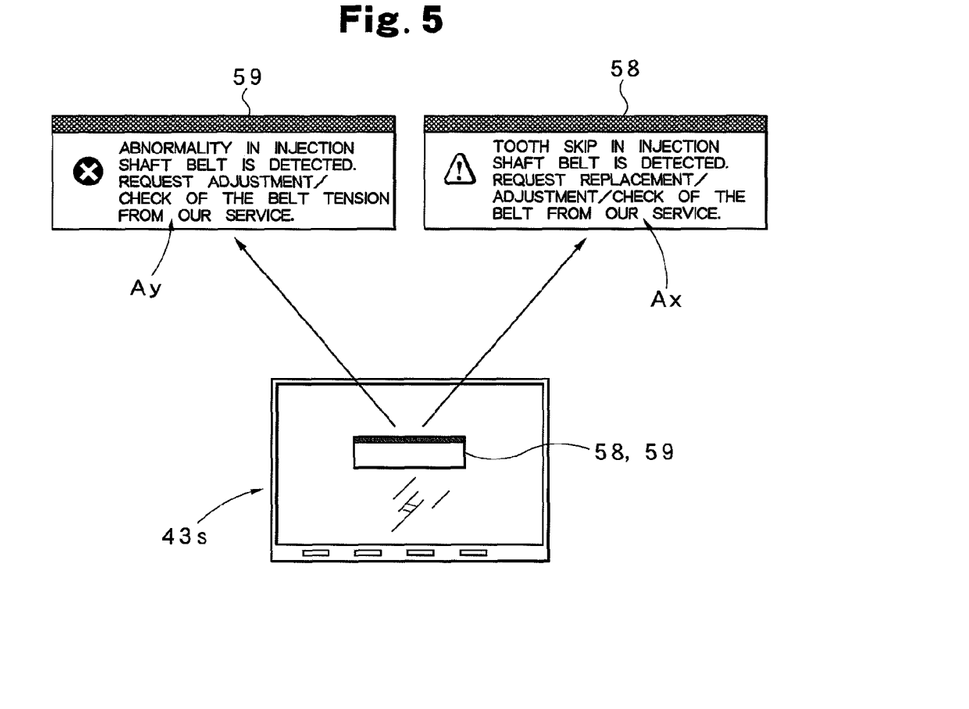
FIG. 5 is a display screen diagram used in the belt monitoring device.

FIG. 5 shows a display screen 43s of the display portion 43. This display screen 43s is displayed on a display such as a liquid crystal display panel or the like disposed on a front face portion or the like of the injection molding machine M. On the display screen 43s, a production or operation state or the like is usually displayed as appropriate, but upon output of the first alarm Ax, the fact that abnormality relating to elongation of the timing belts 6a and 6b has occurred is displayed on a window display portion 58. As a result, alarm message corresponding to the first alarm Ax is displayed on the window display portion 58. Also, upon output of the second alarm Ay, the fact that abnormality relating to tooth skip of the timing belts 6a and 6b has occurred is displayed on the window display portion 59. As a result, alarm message corresponding to the second alarm Ay is displayed on the window display portion 59.

Figure 7:
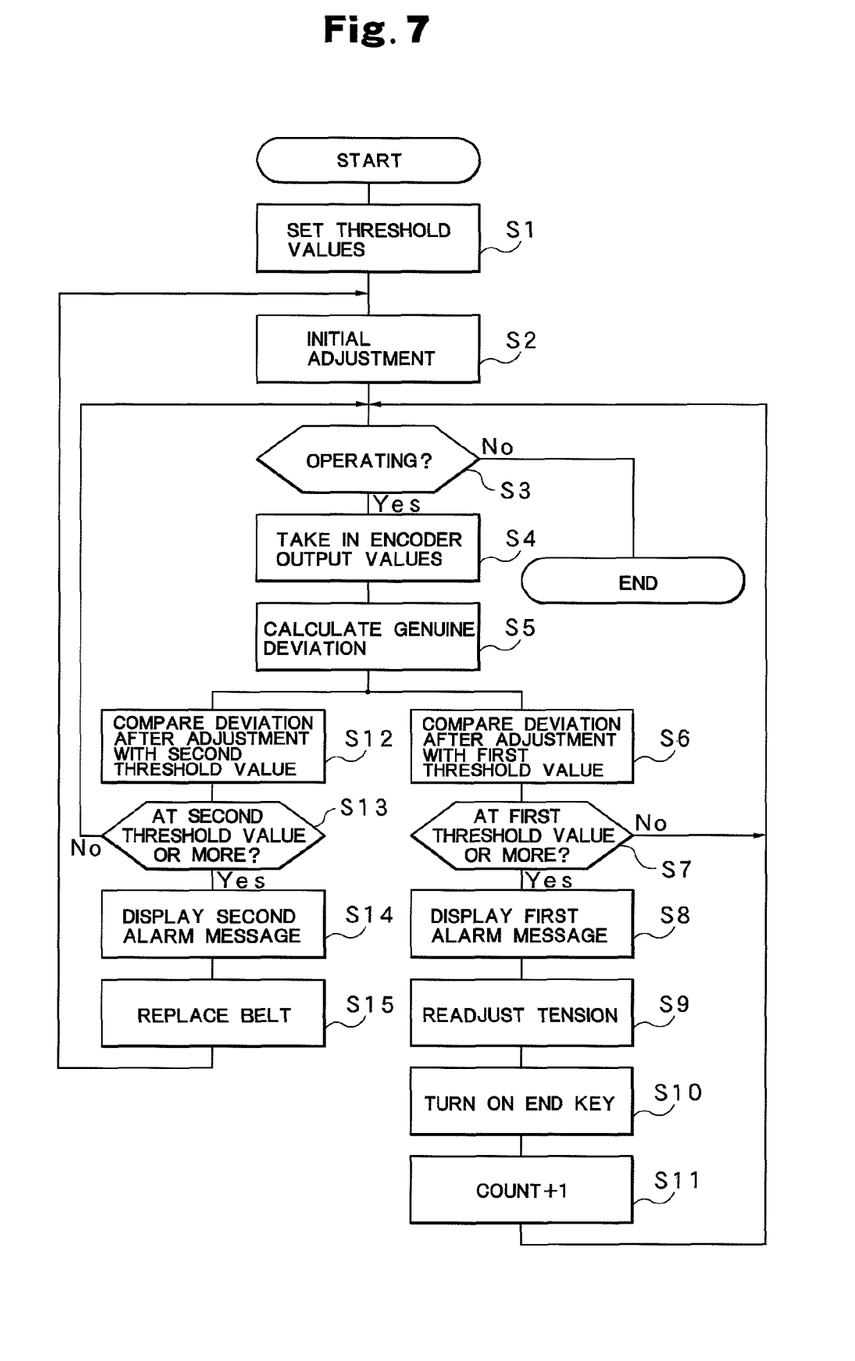
FIG. 7 is a flowchart for explaining the operation (function) of the belt monitoring device.

Subsequently, an operation (function) of the belt monitoring device 1 according to this embodiment will be described along a flowchart in FIG. 7 by referring to each drawing.

First, by using the setting screen 42s shown in FIG. 4, the first threshold value Ksf and the second threshold value Kss are set (Step S1). As for the first threshold value Ksf, a threshold value that can detect abnormality relating to elongation (relative elongation) of the timing belts 6a and 6b is set in accordance with the size of the deviation (deviation after adjustment) Ke between the encoder output value Da and the encoder output value Db. In the setting, since ten keys are displayed on the window upon touch on the abnormality detection pulse setting key 51 constituted in a touch-panel format, a desired value is inputted as a threshold value. The exemplification shows an example in which "50" is set. As a result, relative elongation of the timing belts 6a and 6b caused by use can be reliably detected, and a state of normality or abnormality of the elongation of the timing belts 6a and 6b can be accurately determined. As for the second threshold value Kss, a threshold value that can detect abnormality relating to tooth skip of the timing belts 6a and 6b is set in accordance with the size of the deviation (deviation after adjustment) Ke between the encoder output value Da and the encoder output value Db. In this case, the second threshold value Kss can be set as a threshold value corresponding to one pitch of teeth in the timing belts 6a and 6b. In the setting, since ten keys are displayed on the window upon touch on the tooth-skip detection pulse setting key 52, a desired value is inputted as a threshold value. The exemplification shows an example in which "100" is set. As a result, tooth skip of the timing belts 6a and 6b can be reliably detected.

Figure 6:
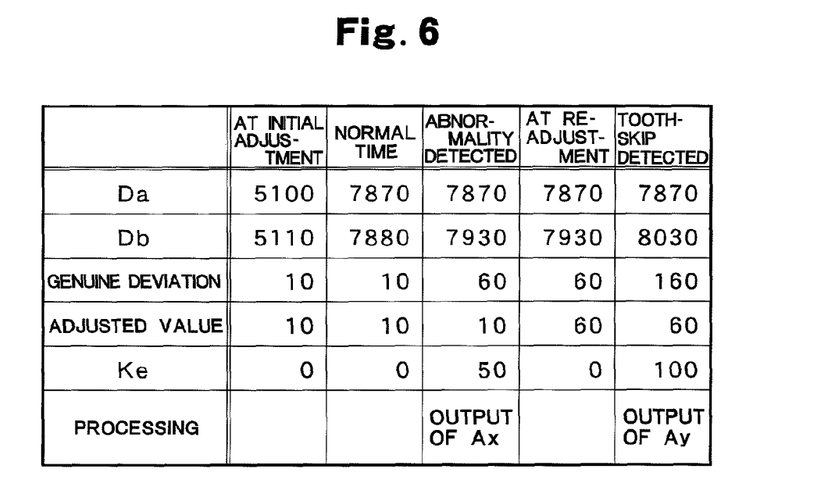
FIG. 6 is a data table for explaining an operation (function) of the belt monitoring device.

Also, at shipment from the plant or belt replacement, initial adjustment is made (Step S2). In the initial adjustment, tension of each of the timing belts 6a and 6b is measured by using a tension adjuster, and positions of the servo motors 29a and 29b or the like are changed so that the tension of the one timing belt 6a and the tension of the other timing belt 6b have the same set value. In this case, even with the initial adjustment, the tensions of the timing belts 6a and 6b cannot be fully matched. That is, since slight deviation Ke is caused, processing in which the deviation Ke is considered as zero by the zero adjusting means 11 is executed. Specifically, as illustrated in FIG. 6, assuming that the one encoder output value Da is "5100" and the other encoder output value Db is "5110" in the initial adjustment, the deviation (genuine deviation) Ke is "10". As a result, since "10" is displayed on the misalignment current-value display portion 55 on the setting screen 42s, the misalignment current-value display portion 55 is touched to display ten keys on the window, and "10" is inputted as an adjustment value. As a result, the value "10" on the misalignment current-value display portion 55 is adjusted (reset) to "0", that is, the deviation Ke after adjustment is obtained. As described so far, by providing the zero adjusting means 11 that considers the deviation Ke as zero, it can be used as a substantial zero-resetting function, and occurrence degree of the deviation Ke can be grasped easily and reliably.

On one hand, during the operation, the encoder output values Da and Db outputted from the rotary encoders 7a and 7b are taken in (Steps S3 and S4). As a result, the encoder output values Da and Db are given to the deviation calculating portion F1. In the deviation calculating portion F1, the deviation (genuine deviation) Ke between the encoder output value Da and the encoder output value Db is obtained by calculation (Step S5). Since the obtained deviation Ke is given to both the first monitoring processing portion F2 and the second monitoring processing portion F3, comparison processing between the deviation (deviation after adjustment) Ke and the first threshold value Ksf is executed in the first monitoring processing portion F2 (Step S6). At this time, if the deviation Ke is less than the first threshold value Ksf, it is determined to be normal, and abnormality processing is not executed (Step S7, S3 . . . ). That is, as illustrated in FIG. 6, if the encoder output value Da outputted from the rotary encoder 7a is "7870" and the encoder output value Db outputted from the rotary encoder 7b is "7880" in the normal time, the deviation Ke (genuine deviation) becomes "10", the deviation Ke after adjustment by the adjustment value "10" becomes "0", and elongation of the timing belts 6a and 6b has not occurred.

On the other hand, if the deviation (deviation after adjustment) Ke is not less than the first threshold value Ksf, it is determined to be abnormal, and the determination result is given to the output processing portion F4. As a result, predetermined abnormality processing, or specifically, as illustrated in FIG. 5, alarm message on the basis of the first alarm Ax is displayed on the display screen 43s by the window display portion 58 (Steps S7 and S8). In the alarm message on the basis of the first alarm Ax, the fact that abnormality has occurred in the timing belts 6a and 6b and that adjustment of tension and check are required for the timing belts 6a and 6b are displayed. That is, as illustrated in FIG. 6, if the encoder output value Da outputted from the rotary encoder 7a is "7870" and the encoder output value Db outputted from the rotary encoder 7b is "7930" at the abnormality detection, the deviation Ke (genuine deviation) becomes "60", and the deviation Ke after adjustment by the adjustment value "10" becomes "50", which is not less than the first threshold value Ksf. As a result, an operator can grasp occurrence of the abnormality relating to elongation of the timing belts 6a and 6b and can stop the operation of the injection molding machine M and readjust the tensions of the timing belts 6a and 6b (Step S9).

The readjustment of the tensions is the same as the initial adjustment and made such that the tensions of the timing belts 6a and 6b are measured by the tension adjuster, and positions of the servo motors 29a and 29b and the like are changed so that the tension of the one timing belt 6a and the tension of the other timing belt 6b become the same set value. Also, the processing in which the deviation Ke is considered as zero is executed by the zero adjusting means 11. That is, as illustrated in FIG. 6, if the one encoder output value Da is "7870" and the other encoder output value Db is "7930", the deviation (genuine deviation) Ke becomes "60". Therefore, since "60" is displayed on the misalignment current-value display portion 55 of the setting screen 42s, by touching the misalignment current-value display portion 55 so as to display ten keys on the window, "60" is inputted as an adjustment value. As a result, the value "60" on the misalignment current-value display portion 55 is adjusted (reset) to "0".

As described above, by providing the function of outputting the first alarm Ax notifying that abnormality relating to elongation of the timing belts 6a and 6b has occurred, an operator can grasp the occurrence of abnormality relating to the elongation of the timing belts 6a and 6b quickly and reliably and can take a measure such as readjustment of tension in the timing belts 6a and 6b or the like quickly. After the tension has been readjusted, the adjustment/check end key 53 is touched to turn it ON (Step S10). As a result, "1" is added to the abnormality detection counter 54 (Step S11). The number of adjustments can be checked by the abnormality detection counter 54. After that, the operation is resumed (S3 . . . ).

On the other hand, in the second monitoring processing portion F3, comparison processing is executed between the deviation (deviation after adjustment) Ke and the second threshold value Kss (Step S12). At this time, if the deviation Ke is less than the second threshold value Kss, it is determined to be normal, and the abnormality processing is not executed (Step S13, S3 . . . ). On the other hand, if the deviation Ke is not less than the second threshold value Kss, it is determined to be abnormal, and the determination result is given to the output processing portion F4. As a result, the abnormality processing, or specifically, as illustrated in FIG. 5, alarm message on the basis of the second alarm Ay is displayed on the display screen 43s by the window display portion 59 (Steps S13 and S14). In the alarm message on the basis of the second alarm Ay, the fact that tooth skip has occurred in the timing belts 6a and 6b and that replacement of the timing belts 6a and 6b or the like is required is displayed. That is, as illustrated in FIG. 6, if the encoder output value Da outputted from the rotary encoder 7a is "7870" and the encoder output value Db outputted from the rotary encoder 7b is "8030" at detection of the tooth skip, the genuine deviation becomes "160", and at the same time, the deviation Ke after adjustment displayed on the misalignment current-value display portion 55 becomes "100", which is not less than the second threshold value Kss. As a result, an operator can grasp the occurrence of abnormality relating to the tooth skip of the timing belts 6a and 6b and can replace the timing belts 6a and 6b (Step S9). Also, after the replacement, the initial adjustment for the tension is made, and the operation is resumed (Step S2, S3 . . . ).

Thus, according to the belt monitoring device 1 according to such an embodiment, since it is configured such that the deviation Ke between the encoder output value Da outputted from the one specific rotary encoder 7a and the encoder output value Db outputted from the other rotary encoder 7b is obtained by the deviation detecting means 8 and the deviation Ke is compared with the threshold values Ksf and Kss set in advance so as to make determination, at least relative abnormality of the timing belts 6a and 6b can be detected. Therefore, the state before fracture of the timing belts 6a and 6b can be detected, and the fracture of the timing belts 6a and 6b can be prevented in advance, and at the same time, contribution can be made to prolongation of the lives of the timing belts 6a and 6b. Also, since the encoder output values Da and Db outputted from the rotary encoders 7a and 7b are used directly, separate detecting means such as a proximity switch, a belt detection portion or the like is no longer necessary. Therefore, since the number of components is not increased, the number of processes and a cost in the manufacture can be reduced, and since an installation space does not have to be ensured any longer, contribution can be also made to simplification of the structure and improvement of appearances. Moreover, since the encoder output values Da and Db are used as they are, the configuration of a control system including software can be simplified, and since the positions of the driving pulleys 5a and 5b can be directly detected, elongation of each of the timing belts 6a and 6b can be detected accurately and reliably.

The preferred embodiment has been described in detail, but the present invention is not limited by such embodiments but can be arbitrarily changed, added or deleted in a range not departing from the spirit of the present invention in the configuration, shape, quantity, methods (procedure) and the like of the details. For example, the example in which the zero adjusting means 11 that considers the deviation Ke as zero is provided is shown, but the means does not necessarily have to be provided. In this case, the servo motors 29a and 29b are moved to the most advanced positions after the initial adjustment, and by making origin correction for the rotary encoders 7a and 7b at the most advanced positions, the exemplified zero adjusting means 11 can be made unnecessary. Also, the example in which the exemplified driven pulley 3 is formed of a single pulley is illustrated, but it may be formed of two juxtaposed pulleys. Moreover, the servo motors 29a and 29b are exemplified as the rotation driving portions 4a and 4b, but other types of motors or a rotation driving portion partially including a motor is not excluded. On the other hand, the example of the two rotation driving portions 4a and 4b is exemplified, but they may be three or more rotation driving portions 4a . . . . Also, an absolute-type encoder is exemplified as the rotary encoders 7a and 7b, but in addition, an increment-type encoder can be also applied as long as a function of holding pulse data in the molding machine controller 41, that is, a function of storing the pulse data as backup when the power is turned off and of setting the stored pulse data as an initial value when the power is turned on is provided. Moreover, the example in which display is made by the display portion 43 as the abnormality output means 10 is illustrated, but in addition, a transmission portion that transmits the result to a portable phone or the like, a printing portion that prints out the result, a sound generating portion that makes a sound and the like may be used in combination. Also, the example applied to the injection device Mi is illustrated, but application may be made to the clamping device side. On the other hand, the example in which both the first threshold value Ksf and the second threshold value Kss are set is illustrated, but only one of them may be set or the first threshold value Ksf may be set in several stages as a plurality of threshold values (tension level large, tension level small or the like).

INDUSTRIAL APPLICABILITY

The belt monitoring device according to the present invention can be used for various injection molding machines, each provided with a plurality of timing belts that transmit rotation from a plurality of rotation driving portions to one driven shaft. Therefore, whether it is an electric injection molding machine or a hydraulic injection molding machine does not matter as long as the similar rotation transmission mechanism is provided.

REFERENCE SINGS LIST

1: belt monitoring device, 2: driven shaft, 3: driven pulley, 4a: rotation driving portion, 4b: rotation driving portion, 4as: rotation shaft, 4bs: rotation shaft, 5a: driving pulley, 5b: driving pulley, 6a: timing belt, 6b: timing belt, 7a: rotary encoder, 7b: rotary encoder, 8: deviation detecting means, 9: abnormality determining means, 10: abnormality output means, 11: zero adjusting means, M: injection molding machine, Da: encoder output value, Db: encoder output value, Ke: deviation, Ksf: first threshold value, Kss: second threshold value, Ax: first alarm, Ay: second alarm

CITATION LIST

Patent Literature 1

JP-H10 (1998)-286842

Patent Literature 2

JP-2003-74649

Patent Literature 3

JP-2000-6222

The invention claimed is:

1. A belt monitoring device for an injection molding machine, for monitoring abnormality of a plurality of timing belts, each extending between at least one or more driven pulleys provided on one driven shaft and driving pulleys provided on each of rotation shafts of a plurality of rotation driving portions, comprising:
- a first rotary encoder for detecting a rotation position of a first rotation driving portion; and
- a second rotary encoder for detecting a rotation position of a second rotation driving portion;
- a molding machine controller having:
- deviation calculating means for receiving an encoder pulse outputted from the first and second rotary encoders for determining a deviation between an encoder output value outputted from the first or second rotary encoder and an encoder output value outputted from the second or first rotary encoder;
- abnormality determining means for comparing said deviation with a threshold value set in advance and for determining that the deviation is the threshold value or more; and
- abnormality output means for outputting at least a determination result of the abnormality determining means.

2. The belt monitoring device for an injection molding machine according to claim 1, wherein said driven shaft becomes a rotation transmission shaft for a ball screw mechanism that advances or retreats a screw of an injection device.

3. The belt monitoring device for an injection molding machine according to claim 1, further comprising:
zero adjusting means that considers said deviation as zero.

4. The belt monitoring device for an injection molding machine according to claim 3, wherein said zero adjusting means is provided with a zero-reset function of resetting said deviation displayed on a setting screen of a display portion to zero.

5. The belt monitoring device for an injection molding machine according to claim 1, wherein said threshold value includes a first threshold value that can detect abnormality relating to elongation of said timing belt.

6. The belt monitoring device for an injection molding machine according to claim 5, wherein said abnormality output means is provided with a function of outputting a first alarm notifying the fact that abnormality relating to elongation of said timing belt has occurred on the basis of a determination result that said first threshold value has been reached.

7. The belt monitoring device for an injection molding machine according to claim 1, wherein said threshold value includes a second threshold value that can detect abnormality relating to tooth skip of said timing belt.

8. The belt monitoring device for an injection molding machine according to claim 7, wherein said abnormality output means is provided with a function of outputting a second alarm notifying the fact that abnormality relating to tooth skip of said timing belt has occurred on the basis of a determination result that said second threshold value has been reached.

9. The belt monitoring device for an injection molding machine according to claim 1, wherein each of said rotation driving portions is formed of a servo motor.

10. The belt monitoring device for an injection molding machine according to claim 9, wherein an absolute-type encoder attached to said servo motor is used for said rotary encoder.

11. The belt monitoring device for an injection molding machine according to claim 9, wherein
an increment-type encoder attached to said servo motor is used for said first and second rotary encoder; and
said molding machine controller stores pulse data as backup when power is turned off and sets the stored pulse data as an initial value when power is turned on.

12. A belt monitoring device for an injection molding machine for monitoring abnormality of a plurality of timing belts, each extending between at least one or more driven pulleys provided on one driven shaft and driving pulleys provided on each of rotation shafts of a plurality of rotation driving portions, comprising:
- a rotary encoder for detecting a rotation position of each of the rotation driving portions by being provided on each of said rotation driving portions; and
- a molding machine controller having:
- deviation calculating means for receiving an encoder pulse outputted from each of the rotary encoders and for obtaining a deviation between an encoder output value outputted from one specific rotary encoder and an encoder output value outputted from the other rotary encoder;
- abnormality determining means for comparing said deviation with a threshold value set in advance and for determining that the deviation is the threshold value or more;
- abnormality output means for outputting at least a determination result of the abnormality determining means;
- wherein each of said rotation driving portions is a servo motor; and
- an increment-type encoder attached to each of said servo motor is used for said rotary encoder;
- said molding machine controller stores pulse data as backup when power is turned off and sets the stored pulse data as an initial value when power is turned on.

13. The belt monitoring device for an injection molding machine according to claim 12, wherein said driven shaft becomes a rotation transmission shaft for a ball screw mechanism that advances or retreats a screw of an injection device.

14. The belt monitoring device for an injection molding machine according to claim 12, further comprising:
zero adjusting means that considers said deviation as zero.

15. The belt monitoring device for an injection molding machine according to claim 14, wherein said zero adjusting means is provided with a zero-reset function of resetting said deviation displayed on a setting screen of a display portion to zero.

16. The belt monitoring device for an injection molding machine according to claim 12, wherein said threshold value includes a first threshold value that can detect abnormality relating to elongation of said timing belt.

17. The belt monitoring device for an injection molding machine according to claim 16, wherein said abnormality output means outputs a first alarm notifying the fact that abnormality relating to elongation of said timing belt has occurred on the basis of a determination result that said first threshold value has been reached.

18. The belt monitoring device for an injection molding machine according to claim 12, wherein said threshold value includes a second threshold value for detecting abnormality relating to tooth skip of said timing belt.

19. The belt monitoring device for an injection molding machine according to claim 18, wherein said abnormality output means is provided for outputting a second alarm notifying the fact that abnormality relating to tooth skip of said timing belt has occurred on the basis of a determination result that said second threshold value has been reached.

* * * * *